United States Patent [19]
Forrester

[11] Patent Number: 5,147,112
[45] Date of Patent: Sep. 15, 1992

[54] VEHICLE WHEEL KNOCKOFF

[76] Inventor: Brett R. Forrester, P.O. Box 2616, Costa Mesa, Calif. 92628

[21] Appl. No.: 736,794

[22] Filed: Jul. 29, 1991

[51] Int. Cl.⁵ ................................................ B60B 7/04
[52] U.S. Cl. ............................. 301/37 SC; 301/37 R; 301/108 R
[58] Field of Search ........... 301/37 R, 37 SC, 37 AT, 301/108 R, 108 SC

[56] References Cited

U.S. PATENT DOCUMENTS

| | | | |
|---|---|---|---|
| 3,170,733 | 2/1965 | Lamme | 301/37 SC |
| 4,067,621 | 1/1978 | Reppert | 301/37 SC X |
| 4,138,160 | 2/1979 | Lohmeyer | 301/108 SC X |
| 4,274,679 | 6/1981 | Brinson et al. | 301/37 SC X |
| 4,462,639 | 7/1984 | Holmstrom | 301/37 SC |
| 4,478,458 | 10/1984 | Flexman | 301/37 SC X |
| 4,818,032 | 4/1989 | Thomas | 301/108 R X |
| 4,961,611 | 10/1990 | Patti | 301/37 SC |

*Primary Examiner*—Russell D. Stormer
*Attorney, Agent, or Firm*—Frank C. Price

[57] ABSTRACT

A design is presented for the installation of a decorative vehicle wheel knockoff. The blades are held on by means of a spring-loaded cap which inserts into a base and is retained by a snap ring. The individual blades can be replaced. The attachment of the base to the wheel is from the inside of the wheel with a flanged ring which screws into the base and compresses the base to the wheel wall. The spring-loaded attachment precludes vibration and its associated noise.

2 Claims, 1 Drawing Sheet

VEHICLE WHEEL KNOCKOFF

BACKGROUND

1. Technical Field

The present invention applies to decorative wheel hub installations for vehicles. These resemble actual wheel knockoffs which are hubs to hold on the wheels of racing cars. The hubs have blades which can facilitate rapid wheel removal and replacement during pit stops. The owners of street automobiles enjoy installing imitations of the knockoffs on their vehicles to present a fast or powerful appearance. The knockoffs can be jewel-like in appearance.

2. Description of the Related Art

There are a number of problems associated with the available decorative knockoffs. Those which are mounted with exterior fasteners are the target of thieves. The protruding blades can become damaged which, for a totally cast item, can mean total replacement for the sake of good appearance. Knockoffs have been known to vibrate, making objectionable noise.

SUMMARY OF THE INVENTION

The present invention provides a knockoff which is resistant to theft and which will not vibrate. If one blade is damaged, it can be replaced. The knockoff can only be removed with the wheel first removed from the automobile.

This inventive knockoff consists of a base which is mounted on the axial hole of the wheel. The base is held to the wheel by a locking flange which is screwed into the internal shaft of the base from the back of the wheel. The blades are slipped onto a cap which holds them to the base and which has a shaft which inserts into the base and is held in place by a snap ring which is inserted from the inside side of the wheel. To prevent vibration there is sandwiched between the cap and the base a wavy spring washer which is compressed before the snap ring is set.

Thus, the knockoff can only be removed from the inside of the wheel. Furthermore, the individual blade mountings can be replaced individually if one is damaged.

Finally, the front of the cap is recessed to allow a decorative medallion to be installed.

DESCRIPTION OF THE PREFERRED EMBODIMENT

Figure 1:
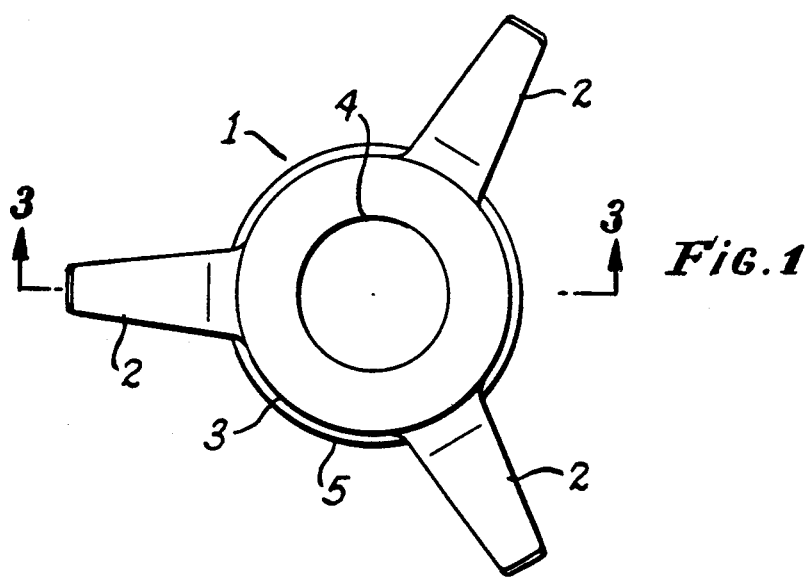
FIG. 1 is a view looking horizontally at the knockoff and into the wheel axis.

In FIG. 1 is seen the wheel knockoff 1 with its three blades 2 and cap 3 which holds the blades 2 onto the base 6. The shoulder 5 rests on the outside of the wheel and against the wheel opening. The recess 4 in the cap 3 is where insignia or other decorative medallions can be mounted.

Figure 2:
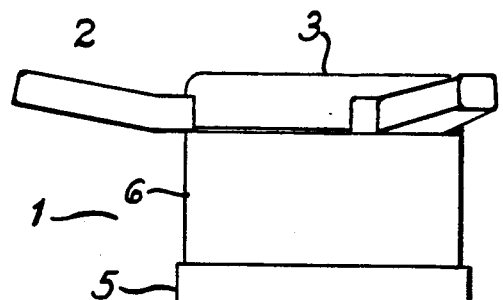
FIG. 2 is a view looking across the face of the wheel.

FIG. 2 shows how the cap 3 fits down over the blades 2 holding them to the base 6. The shoulder 5 of the base 6 is seen to rest against the wheel wall which is shown in phantom. The retaining ring 15 compresses the wheel wall between the shoulder 5 and the ring 15 to hold the knockoff in place on the wheel.

Figure 3:
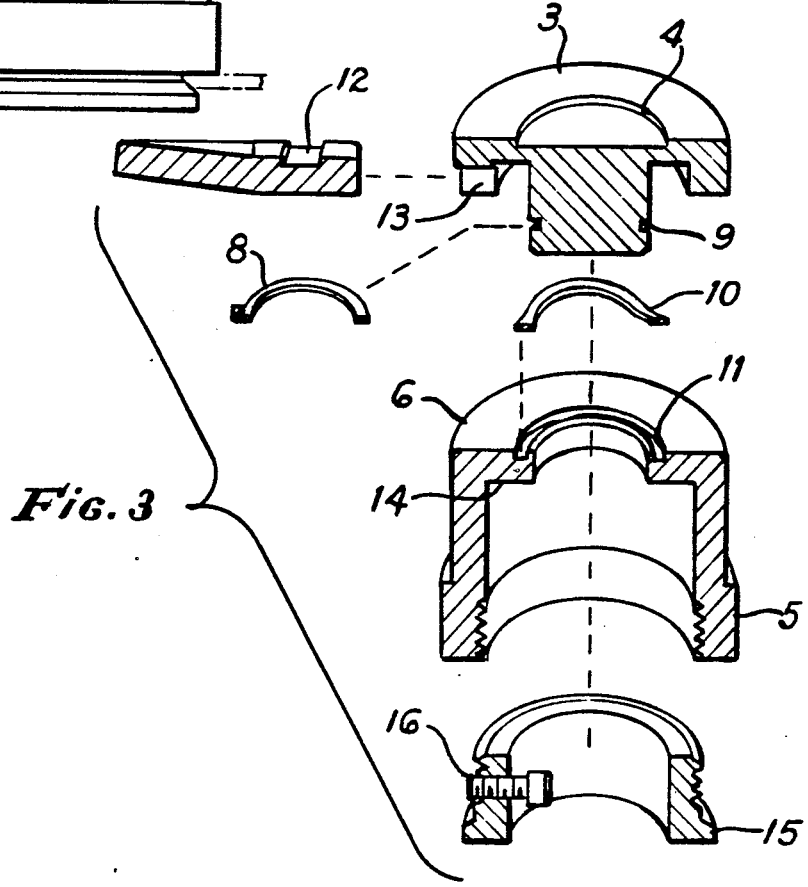
FIG. 3 is an exploded sectional view illustrating the assembly arrangement of the parts.

FIG. 3, an exploded view, shows how all the parts are assembled. In this view can be seen the tongue 13 of the cap and the groove 12 of the blade 2 which holds the blades in place for easy removal. The tongue or ring 13 also has notches where the blades are mounted. The snap ring 8 fits into the groove 9 on the shaft of the cap 3. The snap ring 8 is mounted from the bottom of the base 6. The cap 3 is tensioned against the base 6 by the wavy spring 10 which sets in the groove 11. The retaining ring 15 can be seen to screw into the base 6 and be held there by the set screw 16.

I claim:

1. An improved decorative wheel attachment for the wheel of a vehicle where the wheel has an axial opening, the attachment mounting at the opening of the wheel, the outside of the mounted attachment and of the wheel being the side facing away from the body of the vehicle, the inside of the mounted attachment and of the wheel being the side facing toward the body of the vehicle, the improvement comprising:

a hollow cylindrical base, the base sized to mount at the axial opening of the wheel, the base having two ends, one end, the inside end, being threaded internally, the other end, the outside end, being partially closed, a flanged, threaded ring with threads sized to match those of the base, the flange holding the base to the outside of the wheel when the flange is threaded onto the base through the wheel opening from the inside of the wheel, a cap having an extended cylindrical portion, the cylindrical portion inserted within the hollowed-out, non-threaded end of the base, the cap acting as a retainer for decorative shapes, the shapes being retained on the outside end of the cap, means arranged inside the base, accessible from the inside of the wheel, for attaching the cap to the base.

2. An improved decorative wheel knockoff for the wheel of a vehicle, the wheel and the knockoff each having an outside and an inside facing away from and toward the body of the vehicle respectively, the body of the wheel having an axial opening, the knockoff mounting at the opening of the wheel, the knockoff including blades, the improvement comprising:

a hollow cylindrical base, the base having an outside end facing away from the vehicle and an inside end facing the body of the vehicle, the base having a shoulder, the shoulder being sized to rest on the outside of the axial opening of the wheel, the base having internal threads at its inside end, the base having a partial closure at its outside end, the partial closure forming an opening, the opening surrounded by a groove, a cap positioned at the outside end of the base, the cap having a circular recessed portion on its outside end, the recessed portion being a mounting place for a medallion, the end of the cap facing the inside of the wheel being formed into two concentric circular shapes, one shape being a ring of notched rectangular cross section with its outside diameter approximately the same as that of the outside end of the cap, the other circular shape being a shaft protruding from within the ring, the shaft having a peripheral groove near its end,

- a number of individual blades which are notched near one end, that end being placed toward the axis of the system of parts, each blade resting upon the surface of the closure of the base with its notch positioned away from the base,
- a circular wavy spring, the spring sized to fit within the groove of the base with a portion of it above the groove before the spring is compressed, the spring being strained by compression of the cap shaft forcibly inserted into the hollow cylindrical base, the blades being held onto the base by the cap,
- a snap ring, the ring sized to fit the peripheral groove of the cap shaft, the peripheral groove being accessible for the snap ring once the cap shaft is made to penetrate the base closure far enough while concommittantly the wavy spring is compressed,
- an externally threaded, flanged ring, the flanged ring sized to screw into the internal threads of the bottom of the base with the flange compressing against the inside of the wheel opening, the flange thus forcing the base against the outside of the wheel, the wall of the flanged ring having a threaded opening perpendicular to the axis of the flanged ring,
- a set screw, the set screw being sized to thread through the flanged ring threaded opening and to compress against the inside of the base.

* * * * *